United States Patent [19]

Dal Monte

[11] Patent Number: 4,909,568

[45] Date of Patent: Mar. 20, 1990

[54] ADJUSTABLE BACKREST FOR THE SEATS OF VEHICLES, PARTICULARLY CARS

[75] Inventor: Antonio Dal Monte, Roma, Italy

[73] Assignee: Fiat Auto S.p.A., Turin, Italy

[21] Appl. No.: 257,247

[22] Filed: Oct. 13, 1988

[30] Foreign Application Priority Data

Oct. 16, 1987 [IT] Italy ............................. 67868 A/87

[51] Int. Cl.⁴ ................................................ A47C 7/46
[52] U.S. Cl. ..................................... 297/284; 297/460
[58] Field of Search .............................. 297/284, 460

[56] References Cited

U.S. PATENT DOCUMENTS

| | | |
|---|---|---|
| 2,843,195 | 1/1956 | Barvaeus ........................ 297/460 X |
| 3,762,769 | 10/1973 | Poschul ................... 297/284 |
| 4,316,631 | 2/1982 | Lenz et al. ........................ 297/284 |
| 4,452,485 | 6/1984 | Schuster ................... 297/284 |
| 4,541,670 | 9/1985 | Morgenstern . | |
| 4,627,661 | 12/1986 | Ronnhult et al. ................... 297/284 |
| 4,632,454 | 12/1986 | Naeit ................... 297/284 |

FOREIGN PATENT DOCUMENTS 2935352  3/1980  Fed. Rep. of Germany ...... 297/284
1310770  10/1962  France .
1423617  2/1976  United Kingdom .

OTHER PUBLICATIONS

European Search Report.

*Primary Examiner*—Peter R. Brown
*Attorney, Agent, or Firm*—Sughrue, Mion, Zinn, Macpeak & Seas

[57] ABSTRACT

The front supporting surface of the backrest is defined by an array of flexible elements (7) located side by side and having a generally S-shaped configuration with a lower forwardly convex curve (4) for supporting the lumbar region of the back and an upper forwardly concave curve (5) for supporting the upper dorsal region. An adjustable device (10, 11) is connected to the lower ends of flexible elements (7) to enable the curvature of the flexible elements (7) to be altered selectively so as to obtain the best adaption of the backrest (1) to the characteristics of the person occupying the seat. A plurality of cables (13) are connected between the adjustable device and an upper cross member for altering the upper curvature of the flexible elements (7).

4 Claims, 4 Drawing Sheets

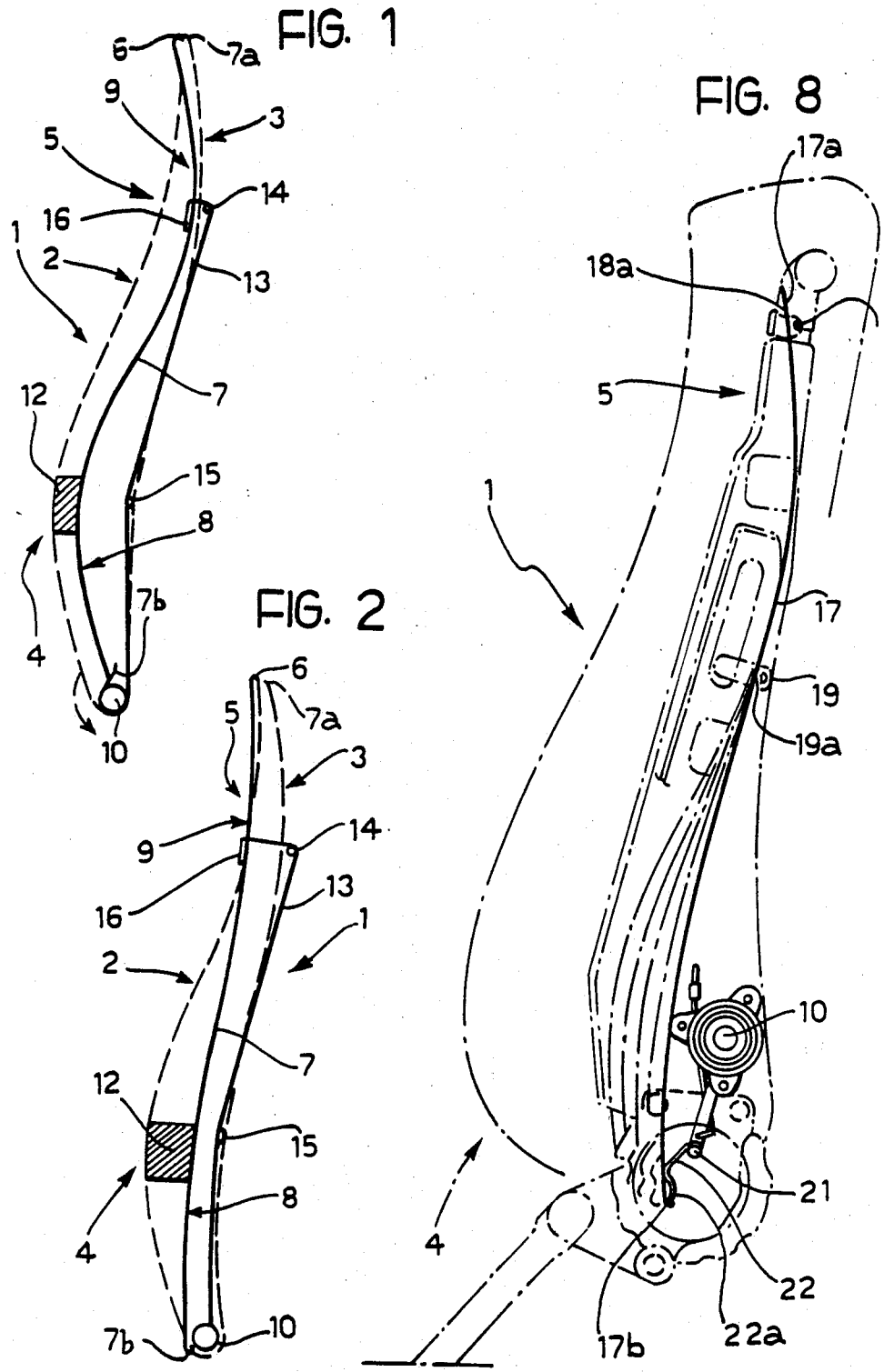

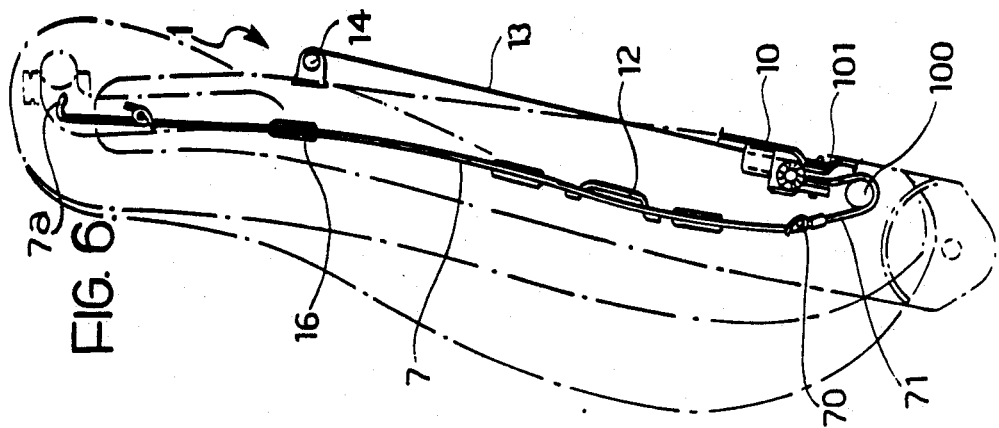
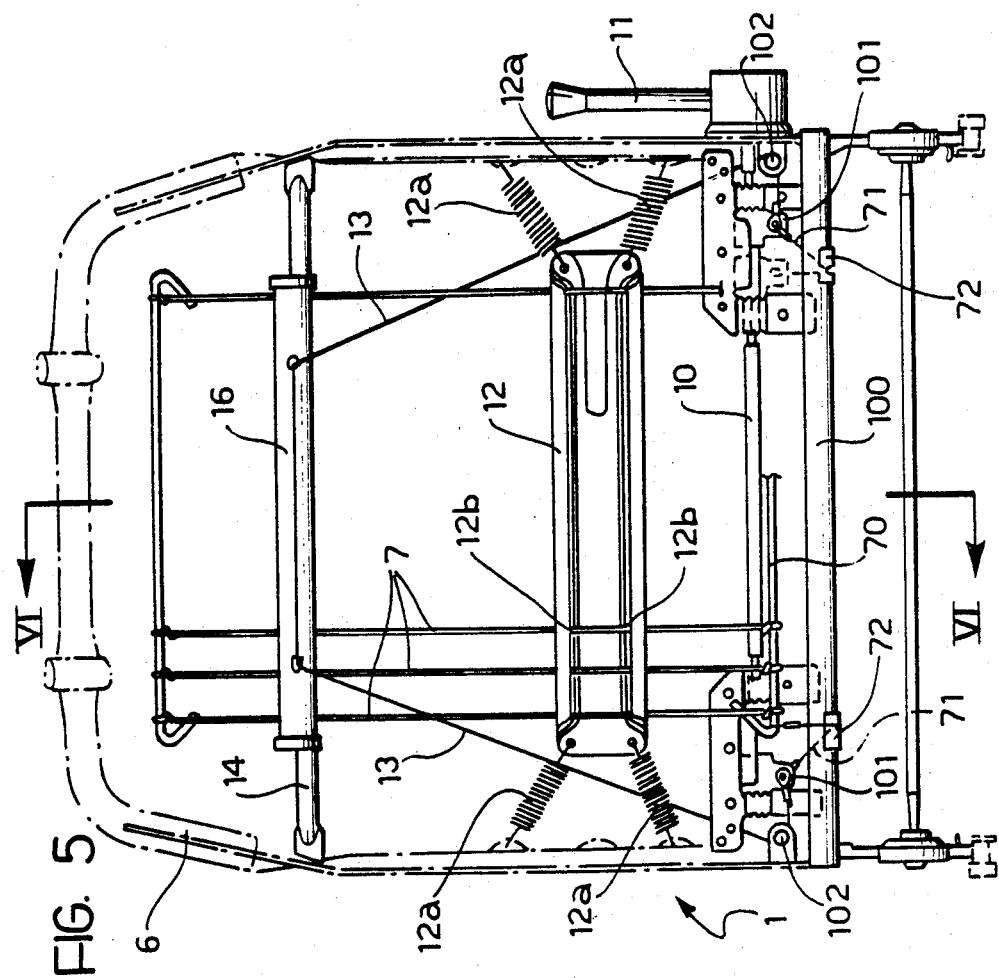

ADJUSTABLE BACKREST FOR THE SEATS OF VEHICLES, PARTICULARLY CARS

The present invention relates to backrests for vehicle seats.

Such backrests are constituted essentially by a structure for supporting the back of the person occupying the seat, made so as to be resiliently yielding and covered, at least on the front part of the seat, with a mass of padding.

In general, apart from its characteristics of flexibility and the ability to vary the inclination of the backrest selectively relative to the squab of the seat, the configuration of the support structure is fixed: in other words, there is no provision for the possibility of obtaining a precise adaptation to the anthropometric characteristics and to the driving and/or travelling tastes of the person occupying the seat.

In numerous sectors, for example, that of home and office furnishings, seats or armchairs have already been suggested, in which the backrest has, so to speak, a vertebral structure which enables its vertical profile to be varied selectively. The use of solutions of this type in the automotive field, however, is difficult to envisage, above all for reasons of cost.

The object of the present invention is to provide a backrest for vehicle seats in which the curvature of the backrest an be varied selectively along its vertical axis, so as to adapt it to the different convexities and concavities of different individuals, while the backrest (and the seat as a whole) retains characteristics of structural simplicity which enable it to be produced on a large scale at economically acceptable costs.

According to the present invention, this object is achieved by virtue of a backrest for vehicle seats with a structure for supporting the back of the person occupying the seat, characterised in that the support structure is defined by an array of flexible elements extending generally vertically side by side, and having a generally S-shaped configuration with a lower forwardly convex curve for supporting the lumbar region of the back and an upper forwardly concave curve for supporting the upper dorsal region, and in that adjustment means are provided which selectively alter the curvature of at least one of the lower curve and the upper curve of the flexible elements.

In the backrest according to the invention, it is thus possible to vary the vertical profile of the backrest to make it straighter or less straight, that is, more or less undulating in the vertical direction, thus enabling each person to select the preferred type of the back support.

The invention will now be described, purely by way of non-limiting example, with reference to the appended drawings, in which:

FIGS. 1 and 2 show schematically the principle of the invention,

FIG. 3 relates to a first embodiment of the backrest accord to the invention,

FIG. 5 shows a further embodiment of the backrest according to the invention,

FIG. 6 is a section taken on the line VI—VI of FIG. 5,

FIG. 8 is a section taken on the line VIII—VIII of FIG. 7.

Figure 4:
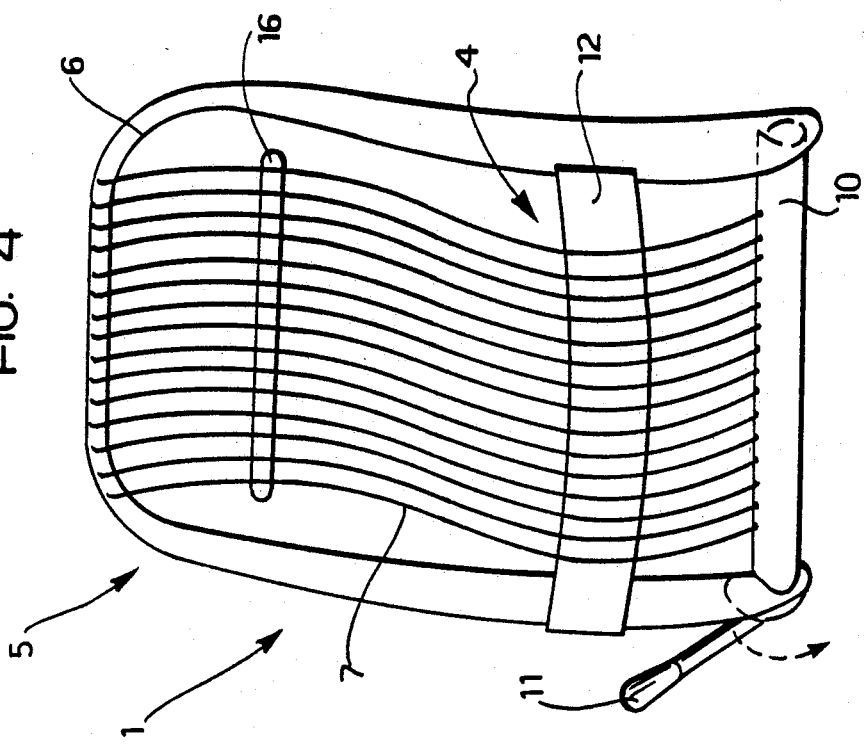
FIG. 4 shows a second embodiment of the backrest.

In the drawings, the backrest of a car seat (not illustrated in its entirety), for example, the seat intended to be occupied by the driver of a car, is generally indicated 1.

In the backrest 1, whose outer profile is schematically indicated by broken lines in FIGS. 1 and 2, it is generally possible to distinguish a front face 2 against which the back of the person occupying the seat rests, a rear face 3, as well as, looking at the backrest 1 in a vertical direction, a lower portion 4 intended to support the lumbosacral region of the person occupying the seat and a upper portion 5 intended to support the upper dorsal region of the person.

According to a known solution, the backrest 1 is constituted by a framework covered on both its faces, and particularly the front face 2, with a mass of padding, not explicitly shown in the drawings.

The framework is usually constituted by an outer frame 6 having the general shape of an inverted U and by a resilient frame connected peripherally to the frame 6 so as to support the padding in a resiliently yielding manner.

In the seat according to the invention, this frame is constituted by a plurality of flexible filiform elements 7 which extend between the upper and lower ends of the backrest 1.

As can better be seen in the schematic views of FIGS. 1 and 2, which may be equated to vertical sections of the backrest 1, the elements 7 have a generally S-shaped profile.

In each element 7 can be seen:

a lower curve 8 intended to support the lumbosacral region of the back of the person occupying the seat, and an upper curve 9 intended to support the upper dorsal region of the trunk.

The curvatures of the two curves 8 and 9 face in opposite directions.

In particular, the lower curve 8 may be defined as "forwardly convex", in that its curvature faces towards the rear face 3 of the backrest 1. The upper curve 9, on the other hand, may be said to be "forwardly concave", in that its radius of curvature faces towards the front face 2 of the backrest 1.

The backrest 1 according to the invention has provision for the possibility of selective alteration of the shape of the lower curve 8 and the upper curve 9 of the elements 7, through the whole range between the condition of greatest curvature (a very undulating vertical profile) illustrated in FIG. 1, and the condition of least curvature (backrest substantially straight) illustrated in FIG. 2.

As a guide, it can be said that, as the height of the person occupying the seat increases, there is a tendency to change gradually towards the least undulating profile of FIG. 2. In fact, very tall people do not usually find that a seat of standard dimensions conforms fully to the curvature of their backs: indeed, the profile of the seat is optimised for subjects considered to be of average size within the range of the motoring population.

The operation of varying the vertical profile of the seat may be achieved simply by hooking the hook-shaped upper ends 7a of the elements 7 to the top section of the frame 6 and connecting the lower ends 7b, in a position for tangential pulling, t a horizontal shaft 10 which extends to connect the lower ends of the side arms of the frame 6. The driver can selectively rotate the shaft 10 by acting on a lever or handle 11 situated on one of the sides of the backrest 1, locking it in the preselected position by a stop mechanism 11a of any known type.

With reference to the geometrical arrangement illustrated in FIGS. 1 and 2, it can be imagined that, in the position of FIG. 1 (the most undulating profile), the lower ends 7b of the filiform elements 7 are arranged more or less above the shaft 10 and are then pulled downwardly—to cause stretching or longitudinal traction of the elements 7 towards the position of FIG. 2—when the shaft 10 is rotated anticlockwise by the user.

Still in the same FIGS. 1 and 2, a resiliently deformable band (for example of rubber) is schematically indicated 12 and connects the elements 7 to keep them apart in the region of the apex of the lower curve 8.

The band 12, if seen in plan, is usually C-shaped with its concavity opening towards the front of the backrest so as to give the backrest 1 good characteristics of transverse restraint in the lumbar region, whatever the preselected adjustment position of the vertical profile. With the band 12 made of a resilient but generally rigid material (for example, in the form of a core of rigid material covered with rubber or the like), it is possible to arrange that, when the movement of adjustment between the end positions illustrated in FIGS. 1 and 2 takes place, the distance between the vertex or apex parts of the lower curve 8 and the part of the front face 2 of the backrest facing them is kept substantially constant, instead of involving a deformation of the band 12 as in the example explicitly illustrated in these Figures. The determining role in the overall definition of the vertical profile of the backrest is thus left to those portions of the elements 7 which are situated along the upper curve 9 and, possibly, to the portions of the lower curve 8 adjacent the band 12. In this way, it is possible to prevent a vertical variation of the lumbar support from resulting in a variation, and above all a reduction, of the lateral restraint.

As far as the variation of the curvature of the upper region (the curve 9 of the elements 7) is concerned, the resilience of the elements 7 (which are prestressed so as to tend to return automatically towards the most undulating profile of FIG. 1) may in itself be sufficient to ensure a correct operation of the seat.

As schematically illustrated in FIGS. 1 and 2, however, it is possible to provide a system of ties 13 (for example, metal cables) adjacent the upper curve 8, which extend from the upper curve 9 of the elements 7 towards the operating shaft 10 and pass over two transmission cross members 14 and 15 which connect the sides of the frame 6 transversely.

The lower ends of the ties 13 are wound round the shaft 10 in the opposite sense to the lower ends 7b of the elements 7.

In this way, when the shaft 10 is rotated anticlockwise (adjustment towards a less undulating profile), the shaft 10 exerts traction o the elements 7 and at the same time slackens the ties 13 so as to enable the elements 7 to move away from the transmission cross member 14 in correspondence with the upper curve 9. When the shaft 10 is rotated clockwise (adjustment towards a more undulating profile), however, the lower ends 7b of the elements 7 are left free to return upwards while the ties 13 are subjected to downward traction, thus biassing the apex parts of the upper curve 9 of the elements 7 towards the cross member 14. The ties 13 therefore constitute tensioning elements acting radially on the upper curve 9 of the elements 7.

Figure 3:
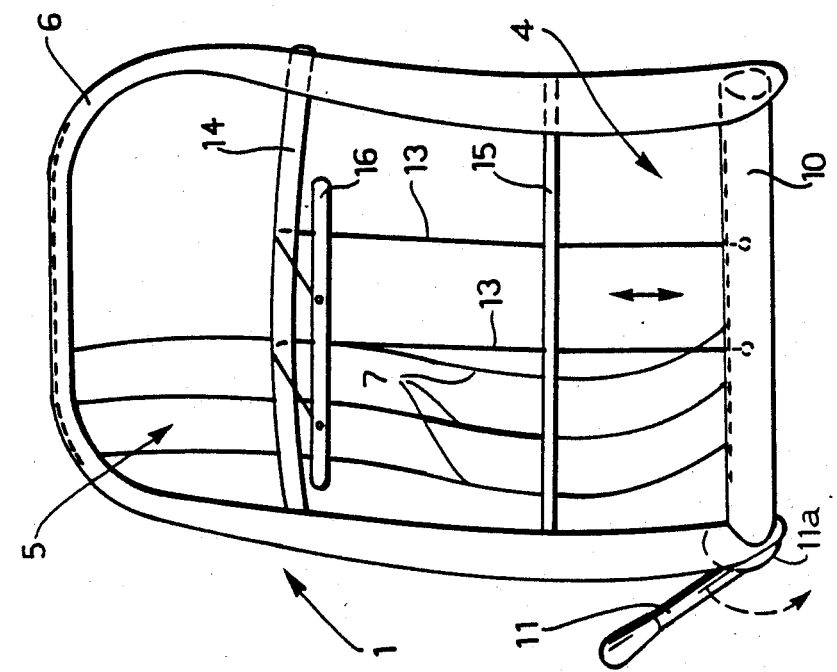

The embodiment illustrated in FIG. 3 corresponds substantially to the structure just described, but this case envisages the use of two ties 13 (or at least the use of a number of ties which is less than the number of flexible elements 7). The ties 13 are in fact connected at their upper ends to a horizontal spacer cross member 16 which connects the elements 7 in correspondence with their upper curve 9. The spacer cross member 16 has the double advantage of enabling uniform radial traction to be achieved on the upper curve 9 of all the elements 7, while ensuring precise vertical alignment of the elements 7.

In the embodiment illustrated in FIG. 4, the cross member 16 has been retained but the ties 13 and their transmission cross members 14 and 15 have been eliminated. In this case, variation of the curvature of the elements 7 in correspondence with their upper curve 9 is left exclusively to the resilient characteristics of the elements 7, without the aid of positive traction such as that exerted by the ties 13. This latter solution may be used particularly when, as described above, it is wished to give the band 12 a certain rigidity so as to keep the horizontal profile of the backrest 1 substantially unaltered, above all as regards the fulfilment of its transverse restraint function.

The embodiment illustrated in FIGS. 5 and 6 incorporates characteristics already described with reference to FIGS. 3 and 4; thus, the reference numerals used in FIGS. 5 and 6 and identical to references already used in FIGS. 3 and 4 indicate structural elements substantially analogous to those already described. In particular, the embodiment of FIGS. 5 and 6 envisages the use of a rigid band 12 coupled to the vertical arms of the frame with the interposition of springs 12a. In this way, as already described above, it is possible for the movement for adjustment of the profile of the backrest to be achieved primarily in correspondence with the upper dorsal region, that is, the upper curve 9 of the elements 7 whose lower regions pass through respective holes 12b provided in the band 12. The arrangement for connection of the elements 7 and the ties 13 to the shaft 10 is also altered slightly with respect to that described above. In fact, the embodiment of FIGS. 5 and 6 is provided not with a direct connection but with an indirect connection by means of a transmission shaft or bar 100. In particular, the lower ends 7b of the elements 7 are connected to transverse element 70 to the ends of which lead auxiliary ties 71 wound around the transmission bar 100 (with the interposition of anti-friction pads 72) and then connected to radial arms 101 of the shaft 10. The lower ends of the ties 13 are also connected to the same radial arms 101 and, before extending towards the cross member 14, pass around transmission pulleys 102 supported by brackets fixed to the side arms of the frame 6.

In the embodiments to which FIGS. 3 to 6 relate, the flexible elements 7 are constituted by wires, such as string steel wires of equal diameter, for example 2 mm.

The dimensions and resilient characteristics of the elements 7 may, however, be selected so as to be differentiated, for example, with the use of more yielding elements 7 in correspondence with the central part of the backrest and stiffer elements 7 near the two edges. In this way, it appears possible to achieve more effective lateral restraint throughout the vertical extent of the backrest 1.

Figure 7:
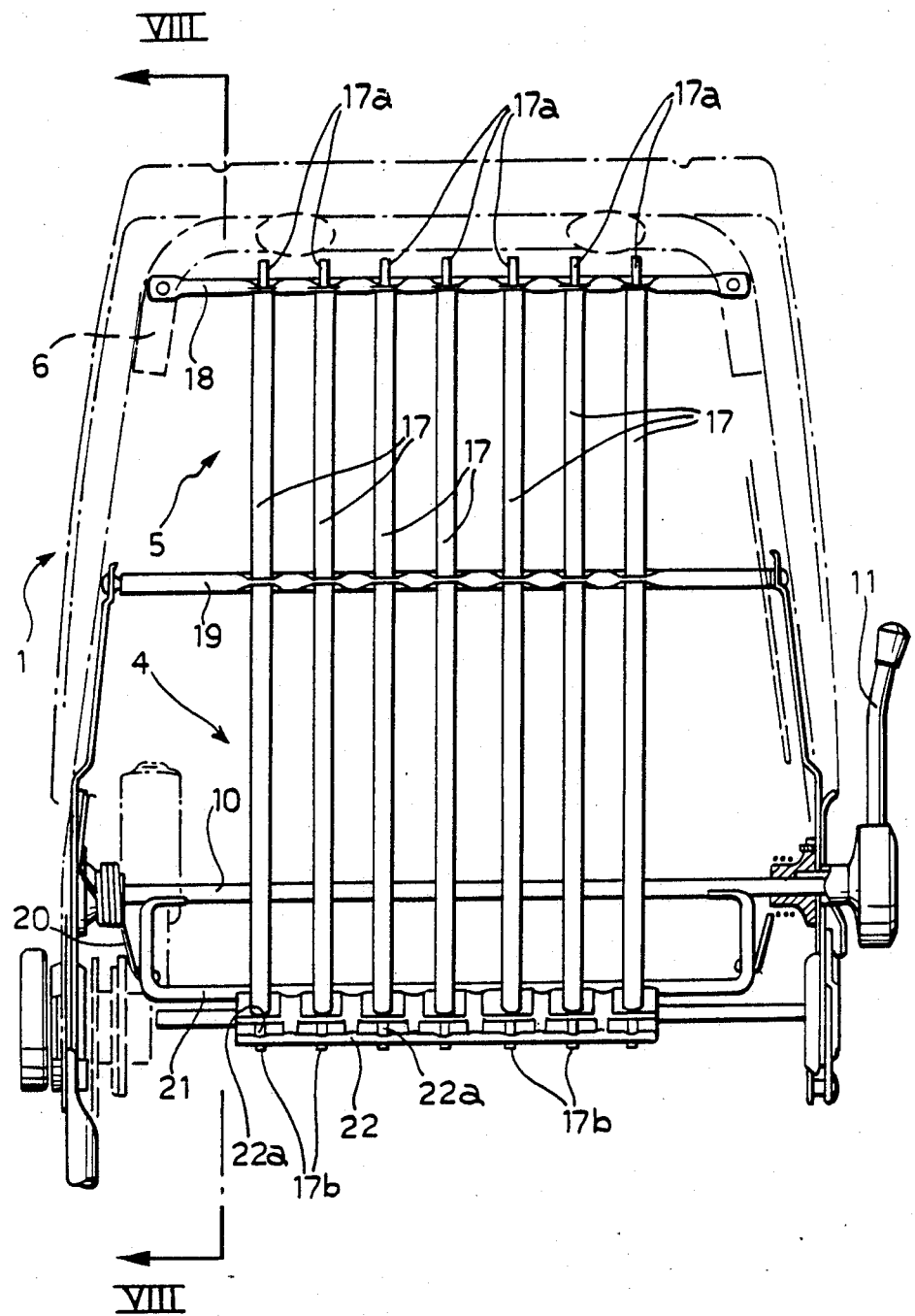
FIG. 7 shows yet another possible embodiment of the backrest.

In the embodiment illustrated in FIG. 7, the flexible elements are constituted by string steel strips 17 having a thickness of 1-2 mm and a width of 10-15 mm.

The strips 17 may be made, for example, by a mechanical cutting operation from a continuous strip of string steel, so as to form narrow upper and lower end parts, 17a and 17b respectively.

The upper ends 17a may be inserted in corresponding elongate slots provided in an upper cross member 18 which connects the two sides of the frame 6 immediately below the top transverse part of the frame 6 itself. The slots, indicated 18a, are oriented transverse the seat so that the strips 17 are kept securely aligned with the front face 2 of the backrest 1 in the direction of their width.

Approximately halfway up the backrest 1, the two vertical arms of the frame 6 are connected by another cross member 19, also provided with slots 19a through which the strips pass. The lower ends 17b of the strips are inserted into an attachment structure associated with the shaft 10 whose rotation, controlled by a biassing spring 20, enables the vertical profile of the seat to be varied selectively. In this case (see the side view of FIG. 8) the connection of the lower ends 17b to the shaft 10 is effected so as not only to achieve a simple coupling, but also to produce a bending stress in the lower ends 17b of the strips 17. For this purpose (see the front view of FIG. 7) a bow 21 which projects downwardly of the shaft 10 is fixed to the shaft, usually by welding. A flexible coupling structure 22 is fixed to the bow 21, also by welding, and projects from the bow 21 in a cantilevered manner, forwardly and downwardly relative to the seat. The structure 22 is provided with slots 22a, each of which accommodates within it the lower end 17b of one of the strips 17.

As a result of the rotation of the shaft 10, therefore, the bow 21 and the framework 22 as a whole may be moved selectively throughout the range between the two end positions, respectively a lower-rear one shown by a continuous line in FIG. 8 and an upper-front one shown by a broken line in FIG. 8.

As a result of the movement between these end positions, as well as longitudinally compressing or extending the strips 17, the frame 21 and the structure 22 also achieve a certain bending of the ends 17b.

This fact may be understood if it is considered that the structure can be likened, as regards each strip 17, to a sort of spring bracket connected at one end to the frame 21 and acting at the opposite end on the end 17b.

When the bow 21 and the structure 22 are raised towards the upper-front end position, the strips 17 are compressed longitudinally so that the bracket is bent downwardly to cause corresponding bending, with consequent downward rotation, of the free end in which the end 17b of the strip is inserted. As a result of this bending rotation, the lower end 17b of the strip rotates, tending to increase the curvature of the lower portion of the strip.

It is thus possible to achieve a more precise shaping of the lower portion of the seat.

I claim:

1. A backrest for vehicle seats with a support structure for the back of the person occupying the seat wherein said support structure comprises an inverted U-shaped frame member with an upper crossbar and two side arms having spaced apart lower ends, shaft means rotatably mounted between said lower ends, an array of flexible elements extending generally vertically side by side and connected at opposite ends thereof to said crossbar and said shaft means, said flexible elements having a generally S-shaped configuration with a lower forwardly convex curve for supporting the lumbar region of the back and an upper forwardly concave curve for supporting the upper dorsal region.

a spacer cross member disposed parallel to said crossbar of said frame and disposed in engagement with said flexible elements adjacent said upper forwardly concave curve, guide bar means secured to said U-shaped frame member between said side arms and extending parallel to said crossbar, tensioning elements connected to said spacer cross member and said shaft means and extending over said guide means to act substantially radially on said upper curve of said flexible elements, and operating means connected to said shaft means for rotating said shaft means to selectively alter the curvature of said lower curve and said upper curve of the flexible elements.

2. A backrest as set forth in claim 1, wherein said flexible elements are comprised of wires.

3. A backrest as set forth in claim 1, wherein said flexible elements are connected to each other, at least in part, by a spacer band in correspondence with said lower curve.

4. A backrest according to claim 3, wherein said spacer band is comprised of resiliently yielding material.

* * * * *